(12) United States Patent
Hoehner

(10) Patent No.: US 11,370,343 B2
(45) Date of Patent: Jun. 28, 2022

(54) HYDRAULIC DROP FRAME TRAILER

(71) Applicant: Cade Hoehner, Crosby, TX (US)

(72) Inventor: Cade Hoehner, Crosby, TX (US)

( * ) Notice: Subject to any disclaimer, the term of this patent is extended or adjusted under 35 U.S.C. 154(b) by 104 days.

(21) Appl. No.: 16/566,706

(22) Filed: Sep. 10, 2019

(65) Prior Publication Data
US 2020/0079266 A1 Mar. 12, 2020

Related U.S. Application Data

(60) Provisional application No. 62/729,807, filed on Sep. 11, 2018.

(51) Int. Cl.
| | | |
|---|---|---|
| *B60P 1/02* | (2006.01) |
| *B60G 17/056* | (2006.01) |
| *B62D 29/02* | (2006.01) |
| *B60G 17/005* | (2006.01) |
| *B60G 17/015* | (2006.01) |
| *B60G 17/017* | (2006.01) |
| *B60S 9/02* | (2006.01) |
| *B60R 16/033* | (2006.01) |

(52) U.S. Cl.
CPC ............ *B60P 1/027* (2013.01); *B60G 17/005* (2013.01); *B60G 17/017* (2013.01); *B60G 17/0152* (2013.01); *B60G 17/0565* (2013.01); *B62D 29/02* (2013.01); *B60G 2202/15* (2013.01); *B60G 2204/46* (2013.01); *B60G 2300/04* (2013.01); *B60G 2500/30* (2013.01); *B60R 16/033* (2013.01); *B60S 9/02* (2013.01)

(58) Field of Classification Search
CPC ... B60P 1/027; B60G 17/017; B60G 2300/04; B60G 2300/38; B60S 9/10; B60F 2301/04; B62D 53/062
See application file for complete search history.

(56) References Cited

U.S. PATENT DOCUMENTS

| | | | | | |
|---|---|---|---|---|---|
| 3,185,330 | A | * | 5/1965 | Buckner | .................. B60P 1/18 414/476 |
| 3,856,319 | A | * | 12/1974 | Hardy | ................ B60G 17/0275 280/63 |
| 5,863,049 | A | * | 1/1999 | Mahvi | ................... B60G 3/145 280/414.5 |
| 7,243,979 | B1 | * | 7/2007 | Stene | ...................... B60P 1/027 296/163 |

(Continued)

FOREIGN PATENT DOCUMENTS

| | | | | | |
|---|---|---|---|---|---|
| WO | WO-8802707 A1 | * | 4/1988 | ................ B60S 9/20 |
| WO | WO-2010082842 A1 | * | 7/2010 | ............... B60D 1/01 |

*Primary Examiner* — Paul N Dickson
*Assistant Examiner* — Matthew D Lee
(74) *Attorney, Agent, or Firm* — Nolte Lackenbach Siegel

(57) ABSTRACT

A hydraulic drop frame trailer for a tow vehicle, the hydraulic drop frame trailer including a trailer frame having two sides and a hitch, a pair of wheels, a first and second frame bracket, a trailer bed mounted over the trailer frame, a first and second pivoting hydraulic cylinder, a plurality of hydraulic hoses, a first and second pivoting arm, an operating station connected to a power supply, a first and second axle-less wheel mount with independent suspension mechanism mounted to the first and second pivoting arm, and a plurality of safety locks, each securing an arm to the trailer frame for locking each rotating arm to the trailer bed during transport.

23 Claims, 6 Drawing Sheets

(56) References Cited

U.S. PATENT DOCUMENTS

| | | | | |
|---|---|---|---|---|
| 7,950,675 B1* | 5/2011 | Quenzi | ............... | B60P 1/027 |
| | | | | 280/6.157 |
| 9,340,087 B2* | 5/2016 | Atkinson | ............... | B60D 1/155 |
| 9,403,559 B1* | 8/2016 | Hadley | ............... | B66D 1/12 |
| 2005/0067799 A1* | 3/2005 | Smith | ............... | B60P 1/027 |
| | | | | 280/6.151 |
| 2009/0102232 A1* | 4/2009 | Risi | ............... | B62D 33/02 |
| | | | | 296/184.1 |
| 2010/0276651 A1* | 11/2010 | Fought | ............... | B60P 3/36 |
| | | | | 254/89 R |

* cited by examiner

HYDRAULIC DROP FRAME TRAILER

CROSS-REFERENCE TO RELATED APPLICATIONS

The application claims the benefit of U.S. Provisional Application Ser. No. 62/729,807, filed on Sep. 11, 2018, the entire contents of which are hereby incorporated by reference.

FIELD

The present disclosure generally relates to a hydraulic drop frame trailer.

BACKGROUND

Loading and unloading traditional cargo or utility trailers presents a number of challenges. For example, the typical deck height for a cargo or utility trailer is anywhere from 12 to 24 inches off of the ground. Therefore, any cargo loaded onto these trailers must be elevated 12 to 24 inches for loading. As such, a typical loading technique is to use one or more ramps to create an incline upon which the material to be loaded is rolled or slid up the ramp onto the trailer deck. This creates both physical and safety challenges in translating heavy items up an inclined ramp onto the trailer deck. For cargo items on wheels, incline ramps present significant safety issues for loading. Further still, typical cargo or utility trailers and their deck heights present challenges for older or disabled owners in loading and unloading.

Therefore, a need exists for a cargo or utility trailer that simplifies loading and unloading by removing or minimizing the deck height differential to the ground. A further need exists for a device that eliminates the need to manually drop or pull down a ramp, which makes it easier and safer to load goods.

BRIEF DESCRIPTION OF THE DRAWINGS

The detailed description will be better understood in conjunction with the accompanying drawings as follows.

Figure 1:
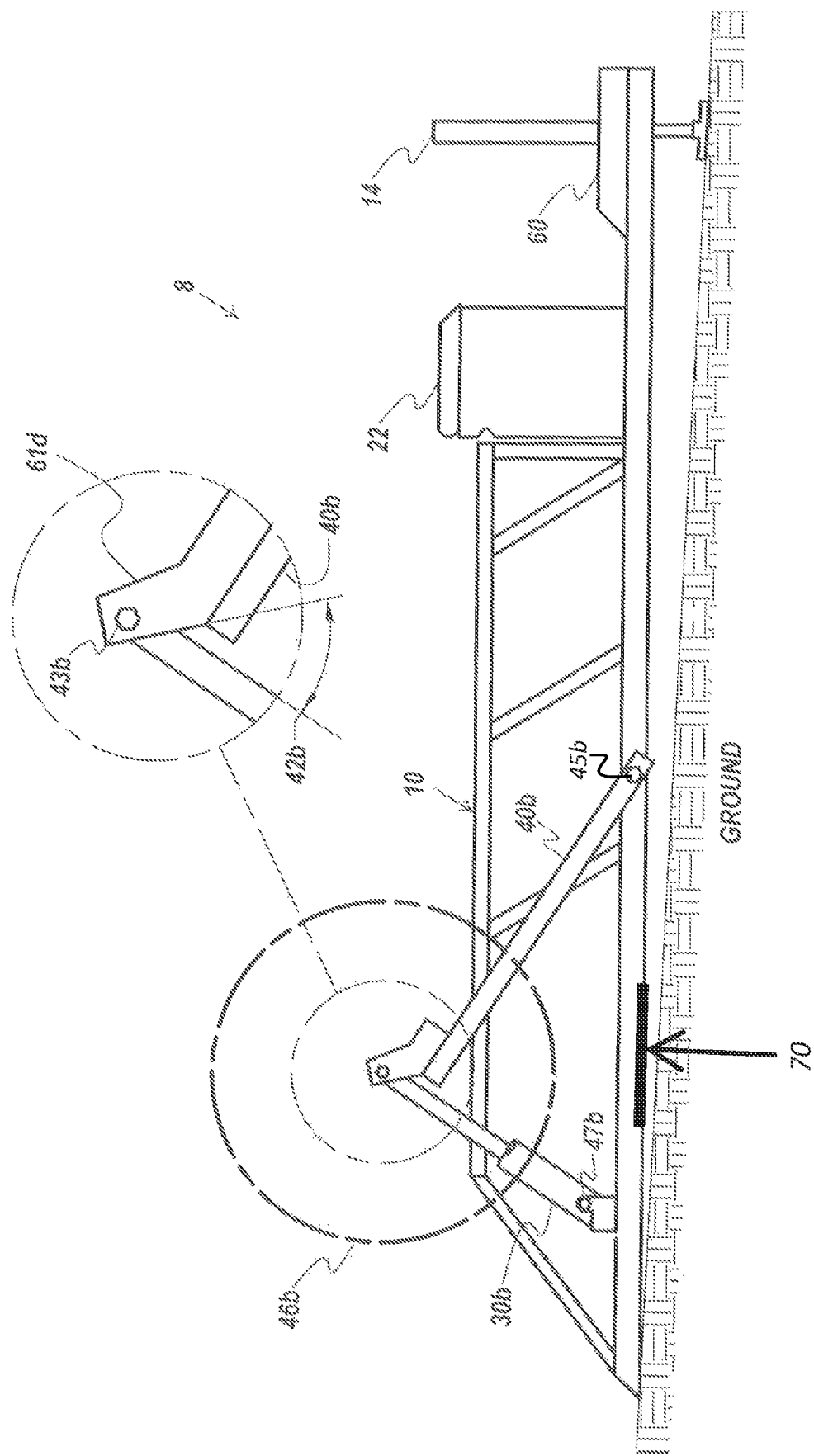
FIG. 1 illustrates a side view of the trailer lowered to the ground according to one or more embodiments of the disclosure.

The example embodiments of this disclosure are described below with reference to the above noted Figures.

DETAILED DESCRIPTION OF THE EMBODIMENTS

In the following, reference is made to examples or embodiments of the inventive concept in this disclosure. However, it should be understood that the inventive concept is not limited to described examples or embodiments. Instead, any combination of the following features, elements, or functionalities, whether related to different embodiments or not, is contemplated by the inventors as a possible combination that may be used to implement and practice an aspect of the present innovation. Furthermore, various examples or embodiments of this disclosure provide advantages over the prior art. However, although these examples or embodiments may achieve advantages over other possible solutions and/or the prior art, whether or not a particular advantage is achieved by a given example or embodiment is not intended to be limiting on the scope of the present disclosure. Therefore, the following aspects, features, functionalities, examples, embodiments, and advantages are intended to be merely illustrative and are not considered elements or limitations of the appended claims, except where explicitly recited therein. Similarly, reference to "the invention" or "the innovation" are not be construed as a generalization of any inventive subject matter disclosed herein and shall not be considered to be an element or limitation of the appended claims except where explicitly recited therein. Before describing the present apparatus in detail, it is to be understood that the apparatus is not limited to the particular example embodiments described herein and that it can be practiced or carried out in various alternative structures or configurations.

For clarity, the following definitions are to be applied to the description of the example embodiments:

The term or phrase "aligned hole" refers to the matching holes on the brackets.

The term "angle" refers to the ideal operating angle between the cylinder and the arm that the invention can operate at 15-180 degrees The term or phrase "axle-less wheel mount" refers to a device that attaches the wheel to the pivoting arm.

The term "brackets" refers to a set of metal plates with matching holes that are parallel to one another that allow a pin to slide through the matching holes in order to connect them.

The term or phrase "control module" refers to a device that actuates the hydraulic pump such as a remote. The control module may be a microprocessor-based electronic device configured to receive control signals from the user and output control signals to one or more valves to selectively provide pressurized hydraulic fluid to various hydraulic cylinders on the trailer. The control module may also be a manifold with a plurality of valves for manual actuation or application of hydraulic pressure to hydraulic cylinders.

The term or phrase "diamond shaped raised members" refers to a texture on the bed implemented to cause traction between the bed and the load on top of it.

The term or phrase "elevation member" refers to a raised part of the frame.

The term or phrase "frame bracket" refers to a u-shaped or forked metal connector within which another part can be fastened by means of a bolt or pin passing through the ends of the connector, attached to the frame.

The term "hitch" refers to a coupling device that attached the trailer to the prime mover. This may be a bumper pull hitch, a receiver hitch, a fifth wheel hitch, or any other type of hitch or connection used to connect a tow vehicle to a trailer.

The term or phrase "hydraulic cylinders" refers to a mechanical actuator that is used to give a unidirectional force through a unidirectional stroke. Embodiments of this disclosure may use linear screw type actuators or other linear actuation devices in place of the hydraulic cylinders without departing from the scope of the disclosure.

The term or phrase "hydraulic drop frame trailer" refers to a device for transporting goods that lowers to the ground and is operated by hydraulics.

The term or phrase "hydraulic jack" refers to a hydraulic cylinder that is used to raise or lower the front of the trailer.

The term or phrase "hydraulic pump" refers to a device that pushes the hydraulic fluid to the hydraulic cylinders.

The term or phrase "hydraulic reservoir" refers to a tank that holds hydraulic fluid.

The term or phrase "integral angled ramp" refers to an angled section of the rear of the frame.

The term or phrase "operating station" refers to a box that contains the hydraulic pump and reservoir which can be used to control the hydraulic cylinders.

The term "pins" refers to steel rods that are used to connect the hydraulic cylinder to the frame and the hydraulic cylinder to the pivoting arm and the pivoting arm to the frame.

The term or phrase "power supply" refers to a source of energy used to operate the pump.

The term or phrase "prime mover" refers to the vehicle moving the hydraulic drop frame trailer.

The term or phrase "pivoting arms" refers to a beam that holds the independent suspension and attaches to the trailer frame and hydraulic cylinder on opposite ends.

The term or phrase "safety locks" refers to a set of brackets attached to each side of the frame and to both of the arms that keeps the bed or deck from lowering during transportation or in any situation where the hydraulic system or cylinder fails.

The term or phrase "safety pin" refers to a steel rod that is used to connect the brackets in the safety lock.

The term or phrase "steel braided hydraulic hoses" refers to a flexible wire sheath covering a hydraulic hose for protection.

The term or phrase "trailer bed" refers to a surface that is attached on top of the frame that supports the load of the trailer.

The term or phrase "trailer frame" refers to the structure that all subcomponents of the hydraulic drop frame trailer are mounted to.

The term "wheel" refers to a circular object that revolves on an axle and is fixed below a vehicle or other object to enable it to move easily over the ground.

The term or phrase "wireless remote-control" refers to a device that controls a machine from a distance.

Embodiments or examples of the present disclosure help the elderly and those with physical disabilities, because the apparatus/trailer does not require them to manually drop a ramp in order to load goods on a trailer. Further, embodiments of the disclosure prevent injuries and/or casualties by eliminating the need for dangerous ramps mechanically or electrically movable ramps needed for loading cargo or equipment on a trailer. The trailer of the present disclosure is configured to lower to the ground to allow safe and easy loading onto the trailer without risk of physical harm or injury.

Now turning to the figures of the present disclosure, FIG. 1 illustrates a side view of an example hydraulic drop trailer 10 in a position lowered to the ground such that the trailer deck or bed 20 is adjacent or touching the ground, thus allowing cargo to be loaded on the trailer deck or bed 20 without being lifted off the ground. Rather, the cargo must only be elevated onto the trailer deck or bed 20, the thickness of which may vary from a mere ¼ inch up to a 3-4 inches.

Hydraulic cylinders 30a and 30b are mounted nearer one end to the trailer 10 frame, typically being nearer to the rear or loading end of the trailer 10 although embodiments of this disclosure are not limited to the cylinders 30 being mounted to either end. A first end of each hydraulic cylinder 30 is pivotally mounted to a fixed part of the trailer 10, such as the frame of the trailer. The second ends of the hydraulic cylinders 30 are pivotally attached to a first and second pivoting arm 40a and 40b that may be pivotally connected at a first end to the trailer frame and at a second distal end to the hydraulic cylinder 30, wherein the second end of the hydraulic cylinder may be the ram end that extends from the cylinder body when hydraulic pressure is applied to the cylinder to lengthen the cylinder. In other embodiments of this disclosure the orientation of the hydraulic cylinder may be reversed such that the ram end is connected to the trailer 10 frame. The trailer wheel and tire assemblies are attached to the pivoting arms 40 such that when the hydraulic cylinder 30 extends, the pivoting arm 40 moves in an arc direction upward or away from the trailer frame to which the end of the pivoting arm 40 is attached. The hydraulic cylinders 30 are on each side of the trailer 10, and as such, they are configured to lower the trailer bed synchronously to ground between the pair of wheels when each hydraulic cylinder 30 is extended by decreasing an angle 42b between each pivoting arm 40ab and each hydraulic cylinder 30ab simultaneously.

An operating station 22 can be connected to or otherwise mounted on the trailer 10. The operating station 22 may include a power supply, such as a battery or electrical connection to other source of power, a hydraulic pump capable of generating hydraulic pressure sufficient to actuate hydraulic cylinders 30, and a control mechanism configured to control the supply of pressurized hydraulic fluid to the cylinders 30 to selectively raise or lower the trailer deck 20 to the ground and back up into an operating position (position where the trailer can be towed on a roadway) via actuation/extension/retraction of hydraulic cylinders 30. Operating station 22 may be an enclosure configured to contain the power supply, pump, etc.

Embodiments of the disclosure may include a hydraulic jack 14 configured to raise and lower the tongue end of the trailer 10 to/from the ground that is mounted to a frame member 60. Trailer jacks are typically used to raise a trailer to a height where a tow vehicle trailer ball may be positioned below the ball receptacle on the trailer 10 so that the trailer tongue may be lowered onto the tow ball. However, in the present disclosure the hydraulic jack 14 may be used to level or optimize the deck 20 height and/or angle of the surface upon which cargo will be placed (typically a trailer deck is horizontal) for ease of loading cargo when the trailer deck 20 is in the lowered position. For example, when the trailer 10 is lowered and the trailer tongue is still attached to the tow vehicle, then the angle of the trailer deck may be too great to allow for easy loading. In this situation that trailer tongue may be lowered by the hydraulic jack 14 to reduce the deck angle to a minimum (nearly horizontal) for easy loading. The hydraulic jack 14 may be operated off the same pump that powers/operates the hydraulic cylinders 30 that raise and lower the trailer deck 20.

Figure 2:
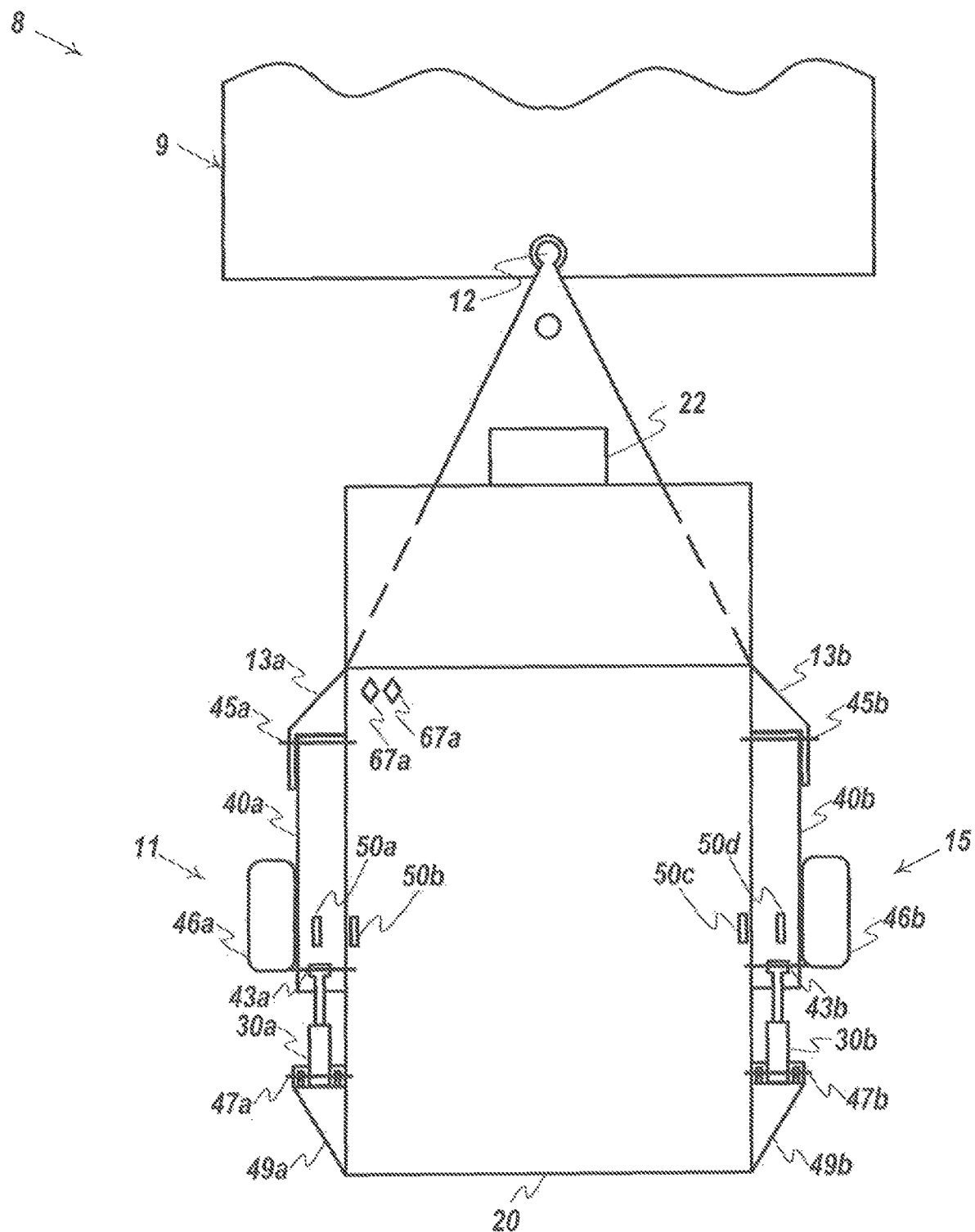
FIG. 2 illustrates a top view of the trailer raised up in the driving position according to one or more example embodiments of the disclosure.

FIG. 2 illustrates a top view of the hydraulic drop trailer for a prime mover (tow vehicle) 9 raised up in the driving position. A trailer bed or deck 20 is mounted over the trailer frame having a first side (left) 11 and a second side (right) 15 and a hitch 12 on the tongue portion of the trailer 10. In various embodiments of the disclosure the trailer bed or deck 20 can be made from wood, steel, or other materials typically used in trailer decks. The hitch 12 can be a bumper pull trailer hitch, mounted beneath or integral to the bumper of the tow vehicle, or other hitch configuration used in towing vehicles, including receiver hitches, fifth wheel hitches, etc. A pair of rotating wheels 46a and 46b supports the first side 11 and the second side 15 of the trailer frame. A first frame support bracket 13a and a second frame support bracket 13b can engage the trailer frame between the hitch 12 and the structure supporting the wheels and the first frame bracket 13a second frame bracket 13b can increase the trailer frame surface area.

The hydraulic cylinders 30a, b can be mounted on the first side 11 and second side 15 of the trailer frame, respectively, to independently raise and lower the trailer deck 20 as desired. The first pivoting arm 40a and the second pivoting arm 40b can be coupled between the hydraulic cylinders 30a, b and the trailer 10 frame. Each pivoting arm 40a and 40b pivots on a first pin or shaft 43a and 43b and a second pin or shaft 45a and 45b, wherein the first pin 43a and 43b is secured to the hydraulic cylinders 30a and 30b and a second pin 45a and 45b secured to the trailer frame. Each hydraulic cylinder pivots on a third pin or shaft 47a and 47b engaging a frame bracket 49a and a frame bracket 49b, which is secured to the trailer frame. A plurality of safety locks 50a-50d secure the pivoting arms 40a and 40b to the trailer frame for locking each pivoting arm 40a and 40b to the trailer frame during transport or when the hydraulic cylinders are not going to be activated.

In various example embodiments of the disclosure, the operating station 22 can function to control extension and retraction of the hydraulic cylinders 30a and 30b. The hydraulic drop frame trailer 10 deck 20 can have diamond shaped raised members 67a and 67b for generating traction for the trailer bed or deck 20 to facilitate easy loading and unloading of cargo.

Figure 3:
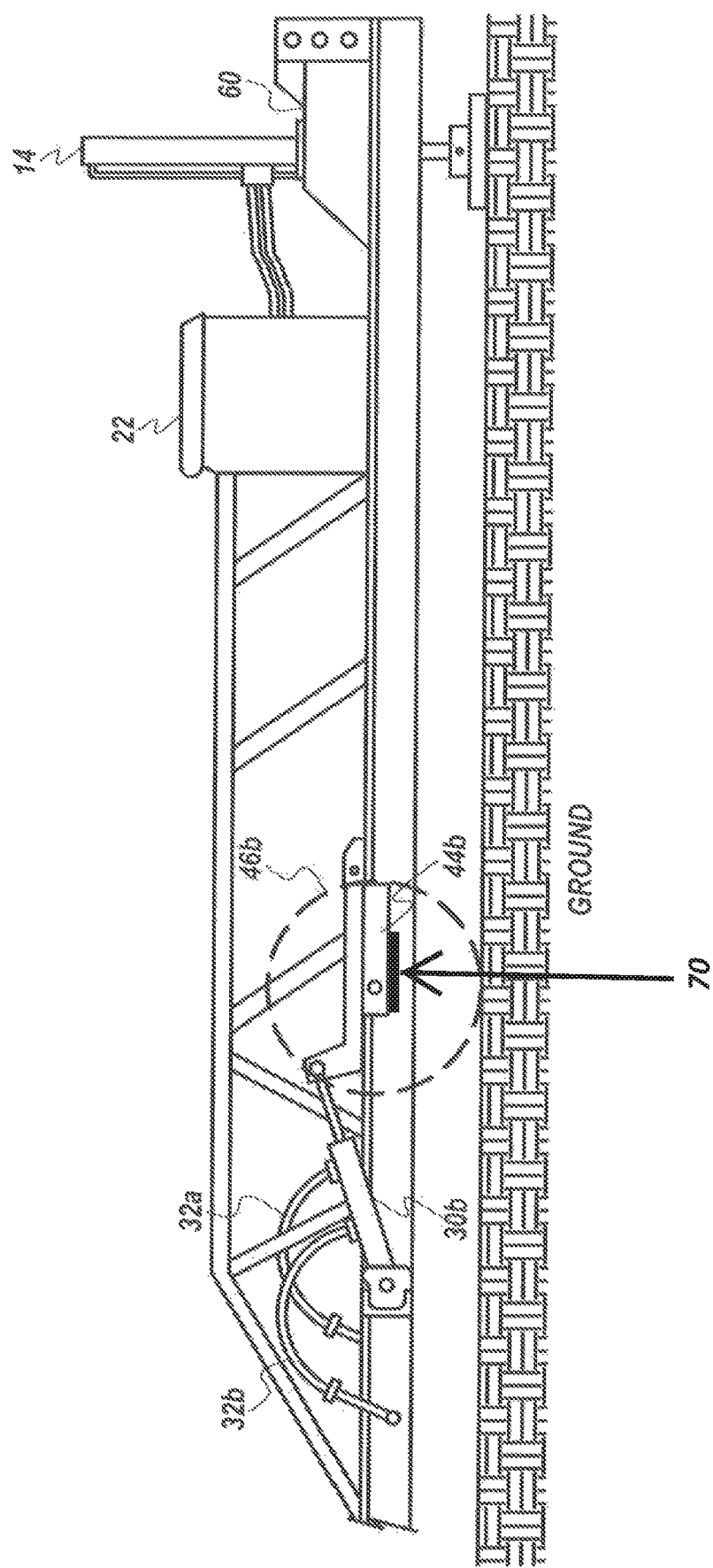
FIG. 3 illustrates a side view of the trailer raised up in the driving position according to one or more example embodiments of the disclosure.

FIG. 3 illustrates a side view of the trailer 10 raised up in the driving position where the deck 20 is generally horizontal and elevated from the ground. In this position the locking safety pins 51 would be installed to maintain the pivot arms 40 in a locked or horizontal position so that the trailer stays in the towable or operating position for safe travel. The locking safety pins 51 may be manually inserted by the user or selectively actuated by, for example, an electrically operated solenoid or small hydraulic cylinder, which would be in communication with and controlled by the operating station 22.

Returning briefly to FIG. 1, the terminating end of the pivot arms 40 may include an offset bracket 61d. This bracket serves to offset the connection of the hydraulic cylinder 30 to the pivot arms 40. More particularly, as shown in FIG. 3, when the trailer is in the elevated position, it is desirable to have the hydraulic cylinders 30 to be slightly inclined from horizontal or the longitudinal axis of the pivot arms 40. This slight offset of the longitudinal axis of the hydraulic cylinder 30 and the pivot arm 40 allows the cylinder 30 to push the pivot arm upward or in the desired pivotal direction when the ram of the hydraulic cylinder is extended. Having the ram of the hydraulic cylinder 30 and the pivot arm on the same longitudinal axis would cause the cylinder to push against the pivot arm 40 in a manner that would likely damage the pivot arm rather than pivoting the arm in normal operation. The offset bracket may offset the attachment point of the hydraulically extending ram by about 1-3 inches, 2-4 inches, or about 3 inches for proper operation.

A plurality of steel braided hydraulic hoses 32a and 32b can be connected to the hydraulic cylinders 30 and a hydraulic pump via a selectively operated or controlled control valve that regulates the supply of pressurized fluid to the cylinders 30. The operating station 22 with a hydraulic pump 24 can be in communication with a power supply for controlling extension and retraction of the pivoting hydraulic cylinders 30a. The power supply may be a battery in the operating station 22 or electrical power received from the tow vehicle through the trailer connection that typically operates the lights and brakes of a trailer. Similarly a separate connection may be made to the tow vehicle to supply power to the operating station 22 to run the hydraulics and/or charge the battery in the operating station 22. In one example embodiment the operating station 22 may include a battery that receives a charging electrical current from a power pin in the light and brake connections made with the tow vehicle.

An axle-less wheel mount 44b with an independent suspension mechanism configured to support a rotating wheel, can be mounted to the pivoting arms 40. The axle-less wheel mount may be a spindle, torsion axle assembly, or other wheel mount assembly used on trailers. However, the wheel mount 44 on the left side of the trailer 10 will not be connected by an axle to wheel mount 44 on the right side of the trailer, as the wheels are configured to independently raise and lower without connection to each other in the present disclosure.

Figure 4:
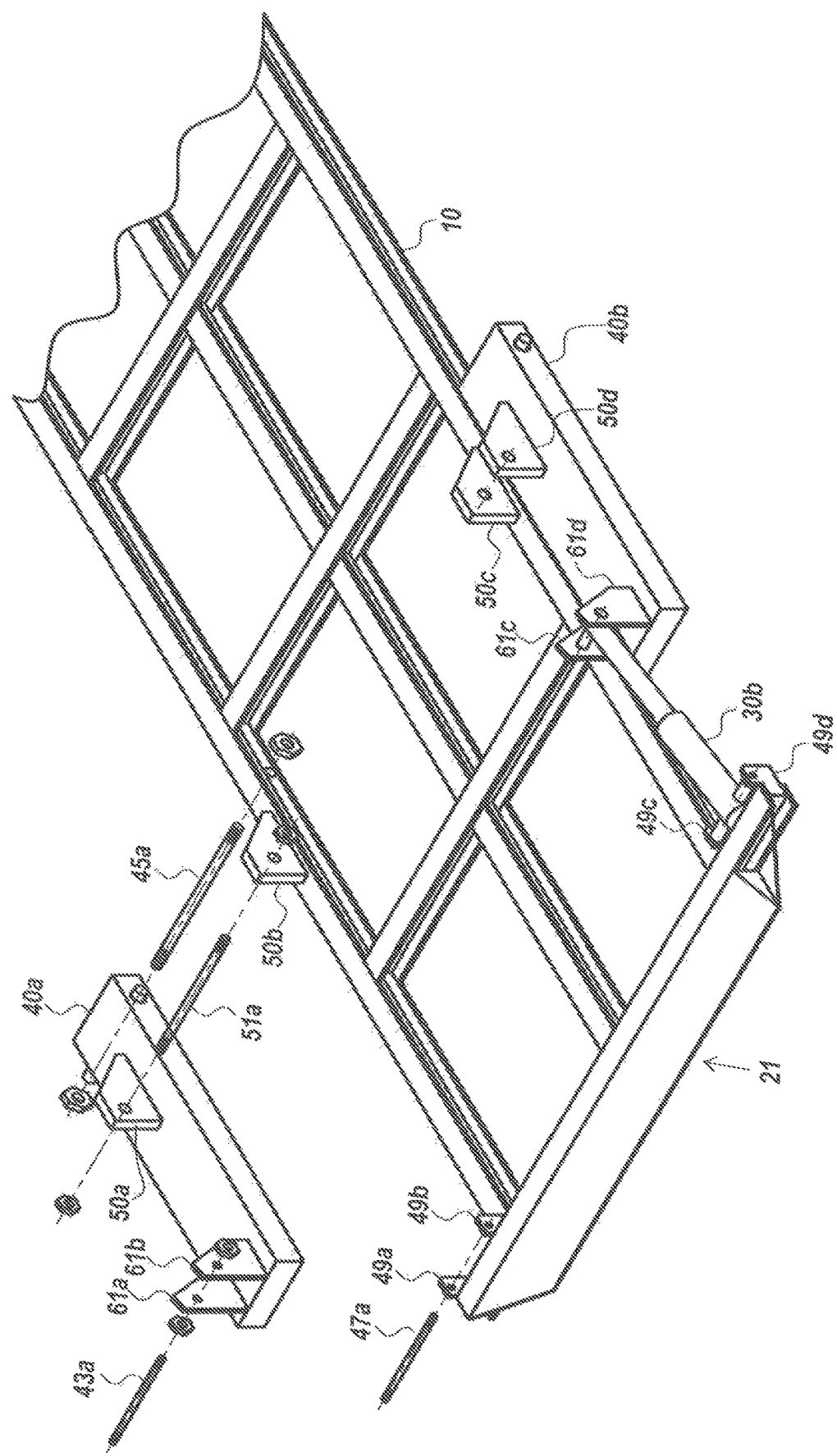
FIG. 4 illustrates a schematic of the trailer frame and arm mechanism according to one or more example embodiments of the disclosure.

FIG. 4 illustrates a schematic of an example trailer 10 frame with an integral angled ramp 21. The angled ramp 21 is generally used to facilitate loading of cargo onto the trailer, whereby the ramp allows the user to elevate the cargo to the cargo deck plane. The elevation generally includes raising the cargo from ground level up to the deck plane level, which represents the thickness or height of the trailer frame. Therefore, the typical rise of an integral ramp 21 may be between about two and about 4 inches. The slope of the integral ramp 21 may be minimized by lengthening the ramp along the longitudinal axis, which is the axis from the front to the back of the trailer. For example, if the trailer frame was 3 inches in height, then the longitudinal length of the ramp could be extended to 12 inches, thus making the slope 3:12 (rise:run), which is very easy to roll or slide cargo over to get onto the trailer decking.

The trailer 10 frame can have a plurality of safety locks 50a-50d for locking each pivoting arm 40a and 40b to the trailer bed during transport, wherein the pivoting arm 40b is coupled between one of the pivoting hydraulic cylinders 30b and the trailer 10 frame.

Each safety lock 50a-50d includes a pair of brackets with an aligned hole. Each aligned hole engages a removable detachable safety pin 51a. Various locking mechanisms are contemplated within the scope of the present disclosure. The shown locking mechanism simply involves a metal plate welded to the trailer frame along with a corresponding metal plate welded to the pivot arm 40. Holes are drilled through plates thus allowing for a pin to be inserted through both plates to keep the pivot arm in a desired running or safe position. Other locking mechanisms, such as clips, shackles, slots, and any other known means for securing a pivot arm to an adjacent frame may be used without departing from the scope of the present disclosure.

Returning to the mounting configuration of the hydraulic cylinders and pivot arms, in various example embodiments of the present disclosure each pivoting arm 40 can pivot on a first pin and a second pin, wherein the first pin 43a is secured to the hydraulic cylinder 30 and a second pin 45a is secured to the trailer 10 frame. In various example embodiments, the hydraulic cylinder 30b is depicted, mounted to the trailer frame bracket 49a-49d and the other end is attached to bracket 61a-61d. Each hydraulic cylinder pivots on pin 47a and 47b engaging a frame bracket 49a and a frame bracket 49b and frame bracket 49c and 49d respectively, which is secured to the trailer 10 frame.

Figure 5:
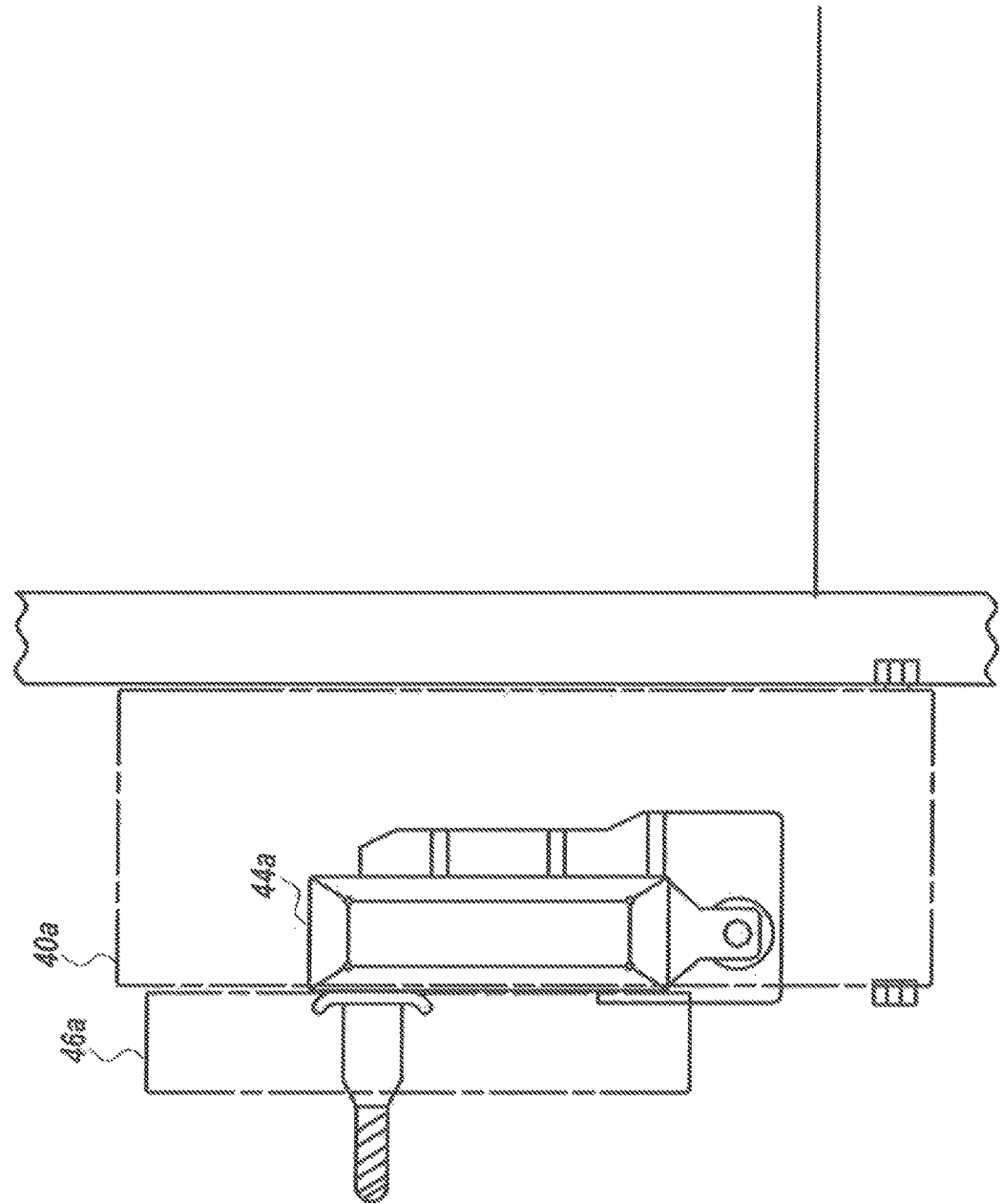
FIG. 5 illustrates a view of the underside of the pivoting arm according to one or more example embodiments of the disclosure.

FIG. 5 illustrates a view of the underside of the pivoting arm 40a. A first axle-less wheel mount 44a with independent suspension mechanism can be mounted to the first pivoting arm 40a, and a second axle-less wheel mount with independent suspension mechanism can be mounted to the second pivoting arm. Each axle-less wheel mount supports a rotating wheel 46a.

Figure 6:
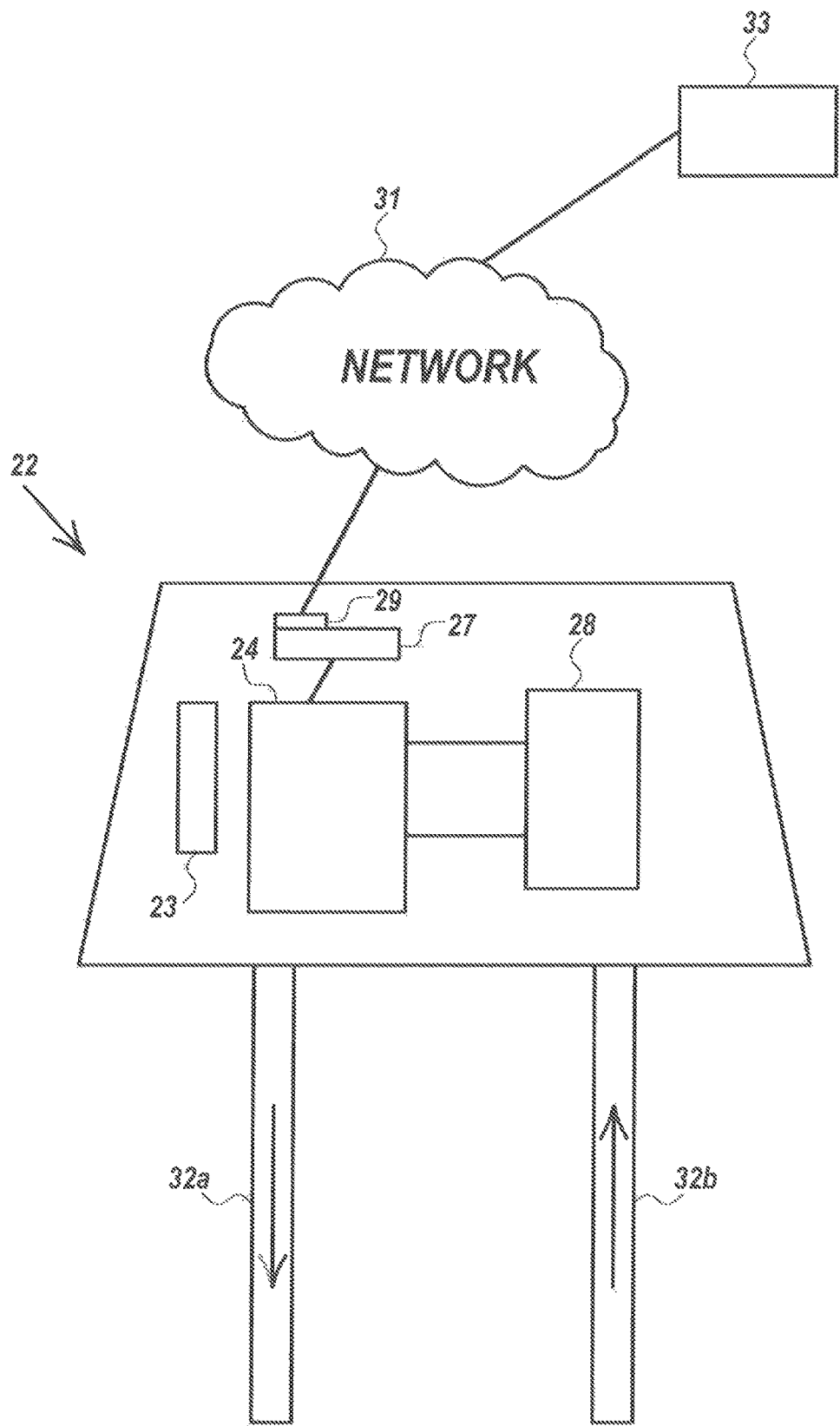
FIG. 6 illustrates an inside view of the operating station according to one or more example embodiments of the disclosure.

FIG. 6 illustrates an inside view of the operating station 22 connected to a power supply 23. The operating station 22 can include a hydraulic pump 24 and a control module 27 for extending and retracting the rods of the first and second pivoting hydraulic cylinders using the hydraulic pump 24. The hydraulic pump is also connected to the hydraulic reservoir 28. The control module 27 can include a wireless remote-control 29 connected to a network 31 for engaging a plurality of client devices 33 enabling the client devices to actuate the hydraulic cylinder from a remote location. The client device can be a personal computer, a tablet, a smartphone, a laptop, or any other computing device. In embodiments, the power supply is the power supply of the prime mover or a battery within the operating station. The control module 27 may include a microprocessor-based system configured to execute instructions, such as a software program, to control the operation of the trailer components. As an example, the control module 27 may control the pump 24 and a number of valves configured to selectively direct pressurized hydraulic fluid to the hydraulic cylinders 30 connected to the pivot arms 40 that raise and lower the left and right wheels of the trailer 10 respectively. The control module 27 may actuate these valves individually such that one side of the trailer 10 may be raised or lowered independently of the other side. The wireless remote-control 29 may include an I/O device configured to send and receive signals from remote devices, meaning devices outside of the operating station 22. These devices may include, for example, RF type remote-control units, such as a handheld remote-control, or other devices capable of transmitting wireless signals to the wireless remote-control unit 29 to control the operation of the trailer 10. In one example embodiment a cell phone using a Wi-Fi or Bluetooth transmission mechanism may be configured to communicate with the remote-control module 29 to raise and lower the trailer 10. Other wireless methods of communication are also contemplated within the scope of the present disclosure.

In operation, the example trailer 10 of the present disclosure may be used to raise and lower the trailer deck to allow for easy loading and unloading of cargo. To lower the trailer deck the user actuates a hydraulic pump that provides pressurized hydraulic fluid to hydraulic cylinders 30 mounted to the trailer 10, such that as the hydraulic cylinder extends its ram arm outward and causes a pivotal arm 40 to extend/pivot upward. The axle and wheel assembly is mounted to the pivotal arm 40, thus when the arm pivots upward in an arc-shaped motion, the trailer deck is lowered while the wheel and tire assembly is correspondingly raised. A key to the operation of the pivotal arm 40 is the use of an offset bracket 61 that offsets the ram arm of the hydraulic cylinder from the longitudinal axis of the pivot arm 40. This allows the pivot arm 40 to move upward when the ram arm is extended. Without the offset bracket, the ram arm of the hydraulic cylinder would push against the pivot arm along the same axis and cause damaged to the trailer and suspension parts. When the user desires to raise the trailer back up to operating or travel height, pressurized fluid is again applied to the hydraulic cylinders to retract the ram arms into the hydraulic cylinders, thus causing the pivot arms 40 to pivot in an arc shaped motion back towards the trailer 10 frame to move the wheel and tire assembly toward the ground and raise the trailer deck upward away from the ground. Once the pivot arm is lowered completely and the trailer is in the operating or towing position, the pivot arm 40 may be secured to the trailer 10 frame so that it is not able to move during towing operations. Also, there is a bracket stop 70 that prevents pivot arm 40 from traveling past a predetermined point, which may be parallel to the trailer 10 frame, for example. Another feature of the trailer 10 of the present disclosure is that a tire may be changed on the trailer 10 without using a jack or other lifting mechanism. The trailer 10 of the present disclosure may be lowered to the ground so that the weight of the trailer 10 is on the ground and then the pivot arm 40 may be further actuated upward away from the ground to raise the tire and will off the ground to allow for a tire change without needing to use a jack or other lifting mechanism.

While these embodiments have been described with emphasis on the embodiments, it should be understood that within the scope of the appended claims, the embodiments might be practiced other than as specifically described herein. In the preceding, reference is made to embodiments presented in this disclosure. However, the scope of the present disclosure is not limited to specifically described embodiments. Instead, any combination of the preceding features and/or elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, examples. embodiments and advantages are merely illustrative and are not considered elements or limitations of the appended claims except where explicitly recited in a claim. Likewise, reference to "the invention" shall not be construed as a generalization of any inventive subject matter disclosed herein and shall not be considered to be an element or limitation of the appended claims except where explicitly recited in a claim.

Aspects presented in this disclosure may be embodied as an apparatus, method or computer program product used to control the operation of one or more of the example embodiments described herein. Accordingly, aspects disclosed herein may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects disclosed herein may take the form of a computer program product embodied in one or more computer readable medium(s) having computer readable program code embodied thereon, wherein any combination of one or more computer readable medium(s) may be utilized.

While the foregoing is directed to embodiments presented in this disclosure, other and further embodiments may be devised without departing from the basic scope of contemplated embodiments, and the scope thereof is determined by the claims that follow.

What is claimed is:

1. A drop frame trailer, comprising:
   a trailer frame having a first side, a second side, and a back side and including a forward hitch for connecting to a tow vehicle;
   a pair of rotating wheels, each wheel for supporting a respective one of the first side and the second side of the trailer frame;
   a trailer deck positioned over the trailer frame and having an integral angled ramp extending across the back side of the trailer frame;
   a pair of offset brackets;
   a pair of mechanical actuators, each mechanical actuator mounted on a respective side of the trailer frame and having a first end and a second end, wherein the first end of each mechanical actuator is pivotally mounted to a respective one of the first side and the second side of the trailer frame and the second end of each mechanical actuator is pivotally attached to a respective one of the offset brackets;
   a pair of pivoting arms, each pivoting arm mounted on a respective side of the trailer frame, each pivoting arm connecting between a respective offset bracket and a respective pivotal mount on the trailer frame, each pivoting arm being configured to pivot in an arc motion upon actuation of the corresponding respective mechanical actuator, each rotating wheel being rotationally mounted to an end of the respective pivoting arm near the respective offset bracket through a respective axle-less wheel mount, the offset brackets each being configured to connect the respective mechanical actuator to the respective pivoting arm at an off axis point from the respective pivoting arm to allow the respective mechanical actuator to pivot the respective pivoting arm in the arc motion;
   a plurality of safety locks, each safety lock securing a respective one of the pivoting arms to the trailer frame by locking the respective pivoting arm to the trailer; and
   an operating station including a power supply, and a control mechanism configured to selectively actuate the pair of mechanical actuators to move the pivoting arms in an arc motion to raise and lower the trailer frame relative to ground.

2. The drop frame trailer of claim 1, further comprising a hydraulic jack for raising a front portion of the trailer frame.

3. The drop frame trailer of claim 1, wherein the trailer deck comprises substantially horizontal or planar wood or steel.

4. The drop frame trailer of claim 1, further comprising diamond shaped raised members for generating traction for the trailer deck.

5. The drop frame trailer of claim 1, wherein the forward hitch is a bumper pull trailer hitch assembly.

6. The drop frame trailer of claim 1, wherein:
   the mechanical actuators are hydraulic cylinders, each hydraulic cylinder including a hydraulic ram; and
   the operating station includes:
      a hydraulic pump to supply pressurized hydraulic fluid to the hydraulic cylinders to extend or retract the respective hydraulic ram from each of the hydraulic cylinders; and
      at least two selectively actuated valves configured to selectively supply the pressurized hydraulic fluid to the hydraulic cylinders to independently raise and lower each side of the trailer.

7. The drop frame trailer of claim 1, wherein the control module further includes a wireless remote-control module configured to wirelessly communicate with a remote-control unit that allows a user to actuate the mechanical actuators from a remote location within wireless communication range.

8. The drop frame trailer of claim 1, wherein each pivoting arm pivots on a first pin, wherein the first pin is secured to the respective second end of the respective pivoting mechanical actuator and to the respective offset bracket of the respective pivoting arm, and a second pin is secured to the trailer frame and the first end of the mechanical actuator.

9. The drop frame trailer of claim 1, wherein each mechanical actuator pivots on a pin engaging a frame bracket that is secured to the trailer frame.

10. The drop frame trailer of claim 1, wherein the power supply is a power supply of the tow vehicle or a battery within the operating station.

11. The drop frame trailer of claim 1, wherein each safety lock comprises a pair of brackets with aligned holes and a removable safety pine, each aligned hole engaging the removable safety pin.

12. The drop frame trailer of claim 1, wherein the mechanical actuators are at least one of hydraulic cylinders and linear actuators.

13. A drop frame trailer, comprising;
   a trailer frame;
   a pair of pivoting arms, each pivoting arm having a first end, a second end, and an offset bracket, each pivoting arm being pivotally secured at the first end to the trailer frame, and having a respective offset bracket positioned on the respective second end thereof distal from the trailer frame;
   a pair of mechanical actuators, each mechanical actuator having a non-extending end and an extending end, each mechanical actuator pivotally secured to the trailer frame at the non-extending end thereof, and pivotally secured to a respective offset bracket at the extending end thereof, a longitudinal axis of each mechanical actuator being slightly angled from a longitudinal axis of the respective pivoting arm and the respective offset bracket having a pivotal securing mechanism to engage the respective extending end of the respective mechanical actuator at a position that is offset from the respective pivoting arm to facilitate pivotal movement of the respective pivoting arm in an arc motion when the respective extending end of the respective mechanical actuator is extended from the respective mechanical actuator;
   a pair of wheels;
   a pair of axle-less wheel mounts, each axle-less wheel mount attached to a respective pivoting arm at a position near the respective offset bracket, each axle-less wheel mount being connected to a respective wheel and providing rotation thereto; and
   a locking assembly positioned on the trailer frame and configured to secure the pivoting arms in a traveling position and prevent movement therefrom,
   wherein the arc motion resulting from extending the extending end of respective mechanical actuator operates to raise the respective wheel in a direction away from ground and correspondingly lower the trailer frame toward ground.

14. The drop frame trailer of claim 13, wherein:
   the trailer frame defines a left side and a right side of the trailer frame; and each of the left side and the right side has a respective pivoting arm and a respective mechanical actuator pivotally mounted thereto to raise and lower the respective wheel on the respective side.

15. The drop frame trailer of claim 14, further comprising a controller configured to selectively raise and lower the left side and the right side of the trailer frame independently of one another.

16. The drop frame trailer of claim 15, further comprising a trailer tongue jack configured to independently raise and lower a tongue of the trailer frame.

17. The drop frame trailer of claim 16, wherein:
the mechanical actuators are hydraulic cylinders; and
the controller further comprises:
an electric power supply,
an electrically driven hydraulic pump, and
at least two selectively actuated valves configured to selectively supply pressurized hydraulic fluid to the hydraulic cylinders to independently raise and lower each side of the trailer.

18. The drop frame trailer of claim 17, wherein the controller further comprises a wireless remote-control module configured to wirelessly communicate with a handheld user remote-control unit that allows a user to actuate the mechanical actuators and the trailer tongue jack from a remote location within wireless communication range.

19. The drop frame trailer of claim 18, further comprising an integral ramp built into a rear portion of the trailer frame opposite the trailer tongue jack, the integral ramp having a height that is equal to or less than a height of the trailer frame.

20. The drop frame trailer of claim 19, wherein a slope of the integral ramp is less than 1:3 (rise:run).

21. The drop frame trailer of claim 13, wherein the mechanical actuators are at least one of hydraulic cylinders and linear actuators.

22. A drop frame trailer, comprising: a trailer frame including a top side, a first side, a second side, and a forward end, the forward end further including a hitch; a trailer bed mounted on the top side of the trailer frame a pair of pivoting arms, each pivoting arm having a first end and a second end, the first end of each pivoting arm pivotally mounted to the trailer frame on a respective one of the first side and the second side; a pair of offset brackets, each offset bracket positioned at the second end of a respective pivoting arm; a pair of mechanical actuators , each mechanical actuator having a first end and a second end, the first end of each mechanical actuator pivotally mounted to the trailer frame on a respective one of the first side and the second side and the second end of each mechanical actuator pivotally attached to a respective one of the offset brackets; a pair of axel-less wheel mounts, each axel-less wheel mount attached to a respective pivoting arm; a pair of wheels, each wheel mounted to a respective axel-less wheel mount; and a plurality of safety locks positioned on the trailer frame and configured to secure the trailer in a travelling position and to prevent movement therefrom, wherein the mechanical actuators drive the pivoting arms and the wheels through an arc as the mechanical actuators are extended and retracted to raise and lower the bed relative to the ground independently of one another.

23. The drop frame trailer of claim 22, wherein the mechanical actuators are at least one of hydraulic cylinders and linear actuators.

* * * * *